United States Patent [19]

Jaspers et al.

[11] Patent Number: 5,380,601
[45] Date of Patent: Jan. 10, 1995

[54] HOLLOW ELECTRODE FOR AN ELECTROCHEMICAL CELL PROVIDED WITH AT LEAST ONE INLET AND ONE OUTLET OPENING FOR GASES, AND ALSO ELECTROCHEMICAL CELL WHICH CONTAINS SUCH AS ELECTRODE

[75] Inventors: Blandikus C. Jaspers; Bernardus A. M. Van Dongen, both of Delft, Netherlands

[73] Assignee: Seed Capital Investments (SCI) B.V., Utrecht, Netherlands

[21] Appl. No.: 39,204

[22] PCT Filed: Oct. 1, 1991

[86] PCT No.: PCT/NL91/00186

§ 371 Date: May 14, 1993

§ 102(e) Date: May 14, 1993

[87] PCT Pub. No.: WO92/06515

PCT Pub. Date: Apr. 16, 1992

[30] Foreign Application Priority Data

Oct. 5, 1990 [NL] Netherlands .................. 9002168

[51] Int. Cl.⁶ ............................................. H01M 8/12
[52] U.S. Cl. .................................... 429/31; 429/40
[58] Field of Search ................................ 429/31, 40

[56] References Cited

U.S. PATENT DOCUMENTS

| 3,536,533 | 10/1970 | Kitamura . | |
|---|---|---|---|
| 4,894,297 | 1/1990 | Singh et al. | 429/31 |
| 5,069,987 | 12/1991 | Gordon | 429/31 |
| 5,106,706 | 4/1992 | Singh et al. | 429/40 X |
| 5,108,850 | 4/1992 | Carlson et al. | 429/40 X |
| 5,188,910 | 2/1993 | Ishihara et al. | 429/31 |

FOREIGN PATENT DOCUMENTS

| 0117062 | 4/1986 | European Pat. Off. . |
| 0320087 | 6/1989 | European Pat. Off. . |
| 0345393 | 12/1989 | European Pat. Off. . |
| 1299346 | 6/1962 | France . |
| 1596118 | 4/1971 | Germany . |
| 268260 | 7/1964 | Netherlands . |
| 6803201 | 9/1968 | Netherlands . |
| 2022565 | 12/1979 | United Kingdom . |

OTHER PUBLICATIONS

Patent Abstracts of Japan, vol. 12, No. 436, Patent No. 63-170867.
Patent Abstracts of Japan, vol. 12, No. 193, Patent No. 62-295365.
Article "Thin Film Solid Electrolyte Systems" John H. Kennedy Thin Film Solids, (1977) v. 43, pp. 41–92.

Primary Examiner—Stephen Kalafut
Attorney, Agent, or Firm—Bachman & LaPointe

[57] ABSTRACT

The invention relates to a hollow electrode for an electrochemical cell which is provided with at least one inlet and one outlet opening for gases, which electrode is made from an inorganic material and is provided on the outside with a gastight layer, which inorganic material is a mixed conductor. The electrochemical cell is preferably of plate-type construction, top and bottom sections being flat. The invention further encompasses an electrochemical cell containing at least an electrode according to the invention.

10 Claims, 5 Drawing Sheets fig-1
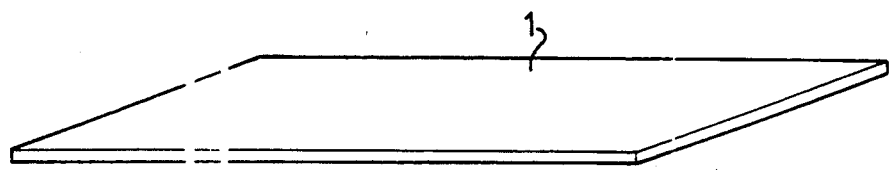
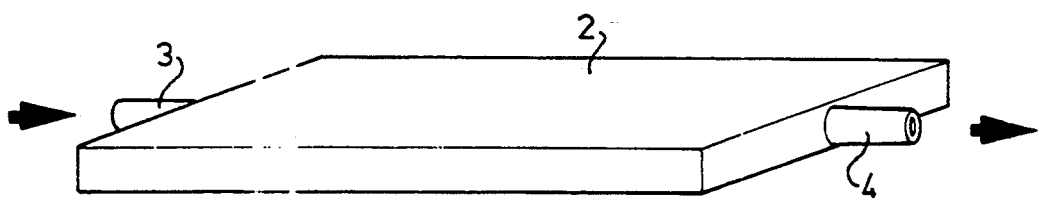
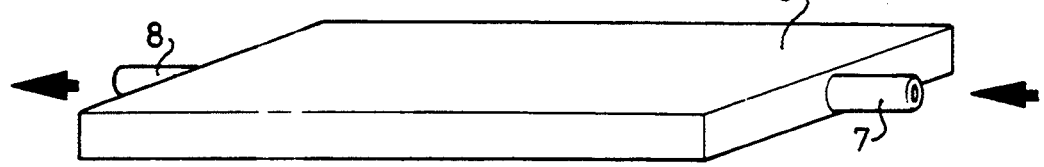
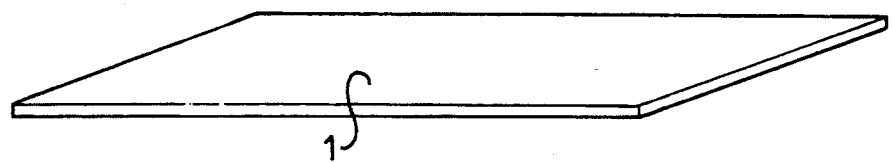

electrolyte anode

HOLLOW ELECTRODE FOR AN ELECTROCHEMICAL CELL PROVIDED WITH AT LEAST ONE INLET AND ONE OUTLET OPENING FOR GASES, AND ALSO ELECTROCHEMICAL CELL WHICH CONTAINS SUCH AS ELECTRODE

BACKGROUND OF THE INVENTION

The invention relates to a hollow electrode for an electrochemical cell provided with at least one inlet and one outlet opening for gases, and also to an electrochemical cell which contains such an electrode.

Such an electrode and such cells are disclosed in French Patent Specification 1,403,729 which describes the use of solid electrolytes in fuel cells and also the stacking of the loose elements and the holding of said elements in a stack. The fuel cells consist of a loose stacking of metallic elements in which the hollow electrodes are porous and not gastight. The hollow electrodes are made from active metals and various materials are used for each electrode. No interconnector is present between the electrodes and a thin electrolyte layer is used.

U.S. Pat. No. 4,469,580 discloses a hollow electrode in which the electrode is mounted on a metal frame and in which the electrode is used with a liquid electrolyte.

Dutch Patent Application 65.05075 discloses a hollow disc-shaped electrode in which the electrode is internally provided with reinforcing means and is provided with a gas inlet pipe. The shape of the electrode can also be a polygon.

Furthermore, European Patent Specification 50,717 and European Patent Application 285,727 describe a hollow electrode.

SUMMARY OF THE INVENTION

A hollow electrode has now been found of the type described in the preamble which is characterised in that the electrode has been made from an inorganic (ceramic) material the outer side of which is gas tight which inorganic (ceramic) material exhibits both electronic and ionic conduction. The electrode according to the invention may either be a cathode or an anode. Gas tight is understood to mean a layer which is very poorly permeable to gases and is air tight. Hydrogen has a very high penetration power, but layers through which a very small amount of hydrogen can pass are also acceptable for the operation. For the cathode, a structure will in general be acceptable in which a small amount of gas can penetrate through the outer side, and even the anode is still usable if some hydrogen should leak through.

European Patent 0,063,807 mentions the existence of expansion problems with different thermal coefficients of expansion.

BRIEF DESCRIPTION OF THE DRAWINGS

FIG. 1 is an exploded view illustrating a cell having the elements in accordance with the present invention;

DETAILED DESCRIPTION

Figure 2:
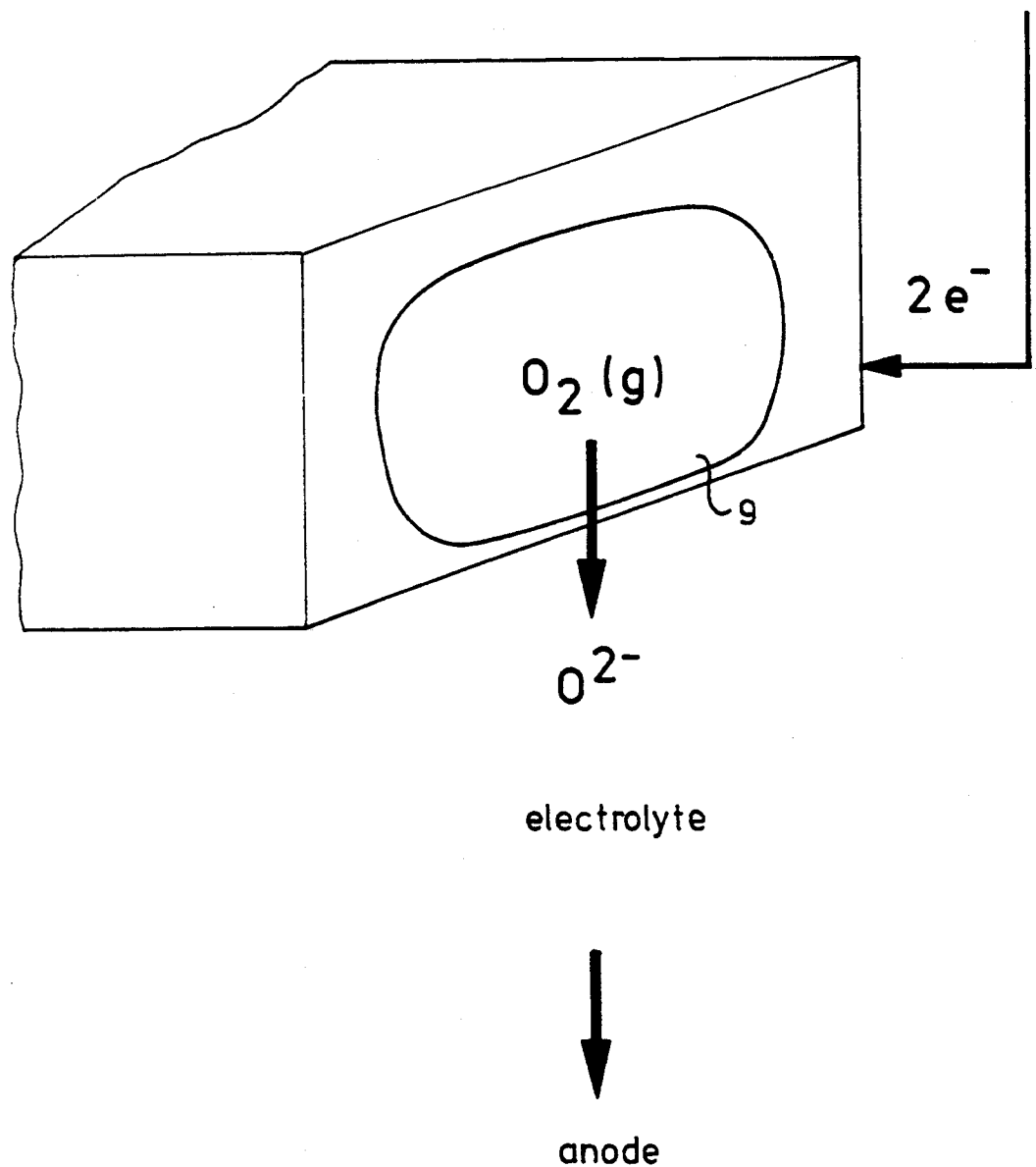
FIG. 2 illustrates the structure of a hollow electrode according to the present invention.

An electrochemical cell and especially a solid fuel cell can easily be made by stacking hollow electrodes according to the invention together with electrolyte and interconnector. Because of the gastight outer side, the gases cannot escape and complicated technical solutions for absorbing a difference in thermal coefficients of expansion of the various cell components are not required. The elements of said cells are mutually freely movable, which eliminates many problems in the field of thermal expansion. Other advantages over the present flat plate model are:

a) because of the absence of the need for adhesion between electrodes with electrolyte and interconnector, which are all made of one material, problems are avoided which relate to the adhesion between various materials such as forming interlayers;
b) the cells and cell stacks are less susceptible to leakage;
c) a greater freedom in the choice of material;
d) there is no need to make the (stacks of) cells gastight (which has hitherto been done at the sides);
e) the cells can easily be stacked;
f) the inlet and outlet pipes of the reaction gases can easily be attached because of the shape of the electrode elements and because of their gastight nature;
g) the thermodynamic countercurrent principle for reaction gases can easily be used;
h) if elements become defective, they can easily be replaced, and this can also be done in an operating setup;
i) the electrode elements can easily be tested separately while they are being made;
j) electrolyte and an electric interconnector do not have to be gastight;
k) because only one material is required for each electrode, the latter are easier to produce;
l) the cells can be operated at a lower temperature;
m) all these advantages result in a greater operating reliability;
n) the reforming process may, if desired, be isolated in the catalytically active hollow anode;
o) because the electrolyte and the interconnector do not necessarily have to be gastight, they can furthermore be very thin;
p) as a consequence of the thinner electrolyte and interconnector layer, a lower power loss occurs.

According to an advantageous embodiment, the electrode is of plate-type construction, top and bottom being flat. This construction has the advantage that the electrodes can easily be stacked.

According to another advantageous embodiment, the hollow space is filled with a porous internal structure. Such a structure has the advantage of a greater active reaction surface.

The cathode can be made from any suitable material, examples being

where $x \leq 1$ and $y \leq 3$ $(Tb_xGd_{1-x})_2Zr_2O_{7-y}$, $Ce_{1-x}Tb_xO_{2-y}$.

The anode is made from inorganic material, for example ceramic, such as $(CeO)_{1-x}$—$(LaO_{1.5})_x$ and $(CeO_2)_{1-x}$—$YO_{1.5})_x$ or even from metals or metal oxides such as Ti, Mn, Fe, Ni, Cu, Pt, NiO, CrO$_3$, CoO, Fe$_2$O$_3$, reduced TiO$_2$, V$_2$O$_3$, VO$_2$ and NiO/Ni.

In using cells according to the invention, metals and metal oxides mean that the particles are dispersed in a ceramic phase or the ceramic element used is filled with loose powder which is packed in such a way that the particles make mutually good contact.

Electrochemical cells, in particular fuel cells, can be made in a conventional manner from the said electrodes.

Such cells may alternately contain electrodes according to the invention and other electrodes. Obviously, it is particularly advantageous to use anode and cathode according to the invention alternately.

Electrochemical cells comprise both the so-called regenerative fuel cells and the more normal fuel cells. In such cells both the conversion and the reconversion of the fuels can be achieved. This principle is seen as an attractive application of the so-called hydrogen economy and as a storage possibility. (See Fuel Cells for Public Utility and Industrial Power by Robert Noyes, Noyes Data Corporation, Park Ridge, N.J., U.S.A. 1977, pages 12-32 and Electrochemical Reactors, Part A, by M. I. Ismail, Elsevier, Amsterdam, 1989, pages 487 and 488.)

The electrodes according to the invention can be used in all such cells, and hereinafter the use will be explained with reference to fuel cells.

In the construction of conventional flat electrodes, one of the great problems is the gastight sealing of the ceramic element. This is necessary to separate air and fuel flows. In the electrodes according to the invention, the gas-sealing action of electrolyte and interconnector is taken over by the electrode. These hollow electrodes are made from mixed-conduction materials. In the electrode, both electronic conduction and electrode reactions together with (ionic) conduction of all the (oxygen) ions therefore take place. The electronic-conduction-blocking function of the electrolyte still exists, as does the ion-conduction-blocking action of the interconnector. The fuel cell elements can then be stacked. Since the elements can move with respect to one another according to this construction, mechanical stress as a consequence of thermal expansion is avoided.

A cell having elements according to the invention is shown in FIG. 1, in which 1 is an interconnector, 2 is a cathode provided with a gas inlet 3 and a gas outlet 4, 5 is a solid electrolyte, while 6 is an anode having a gas inlet 7 and a gas outlet 8.

The structure of a hollow electrode according to the invention is shown in FIG. 2 (a cathode is shown), in which 9 is the hollow space through which the oxidant (here gaseous oxygen) is passed. The hollow electrode (cathode) is in contact with the solid electrolyte which is in turn in contact with an optionally hollow electrode (anode).

The construction must ensure a good electrical (electronic and ionogenic) contact between the separate elements. The quality of the contact is dependent on the flatness of the elements and can be improved by providing a conductive powder of the solid electrolyte between the elements. Such a powder may also improve the ease of the free horizontal movement during thermal expansion.

As a consequence of the absence of thermal stresses, the fuel cell is less susceptible to the occurrence of leaks during thermal cycles. As a result, a freer choice is possible in using material in relation to the thermal expansion. The requirement for similar thermal coefficients of expansion for all the materials to be used no longer carries much weight in this case and more materials can therefore be used for the fuel cell elements, as a result of which a higher conductivity (both electronic and ionogenic) and/or better catalytic properties and other favourable properties can be utilised.

The need to seal off the anode to avoid short-circuiting if external oxygen is involved, is eliminated. Of course, such a sealing can indeed be used in addition for safety considerations. This is because all the gas flows inside the gastight electrodes remain, with the result that the stack of fuel cells is placed in an atmosphere having a low oxygen content. Small amounts of oxygen which leak out of the cathode therein can be flushed away by passing the anode exhaust gases around the stack. In the case of hydrogen, carbon monoxide and other fuel leakage from the anode, the risk of explosion is substantially decreased and the limit of detection for fuel gases becomes appreciably less critical. If the oxygen loss from the cathode is too great, the sealing of the separate elements is appreciably easier than in the case of monolithic flat products.

Figure 3:
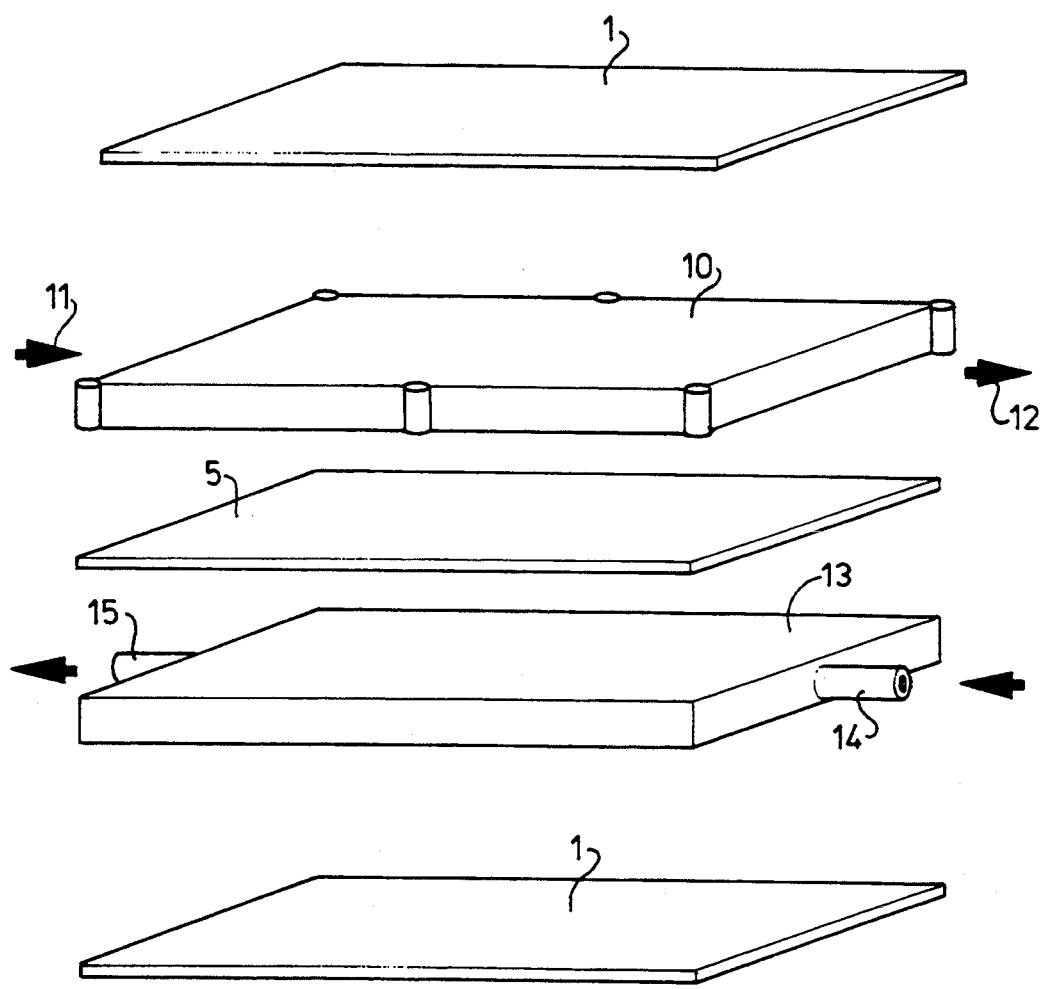
FIG. 3 illustrates a second embodiment of a cell in accordance with the present invention.

If an atmosphere having a low oxygen content is used, consideration can be given to passing fuel gases around the stack of elements, with the result that, if desired, open anodes can be used. In this connection, only the use of oxygen-containing gases requires a gastight structure (see FIG. 3, in which 1 is an interconnector, 5 is an electrolyte, 10 is an open electrode which is provided with a gas inlet 11 (this can be an open side) and a gas outlet 12 (this can be an open side) and 13 is a closed electrode which is provided with a gas inlet 14 and a gas outlet 15.

Open cathodes in an oxygen-containing atmosphere combined with closed anodes are also possible in principle.

The elements can simply be placed one on top of the other using a conductive and "lubricating" powder, for example electrolyte powder. If the correct number of cells is used, pressure can be applied to the stack to ensure good contact between the plates. As a result of performing a repeated thermal cycle with a pressure applied, the elements will settle, producing a better contact.

The hollow electrodes can be provided with an inlet and an outlet which are made from the electrode material, with the result that the corrugated structures can easily be joined. Even outlet gases from a cluster of fuel cells can be passed through every (other) cluster of fuel cells to optimise the output of the system. This can be done, for example, to achieve a better energy efficiency or to ensure a complete conversion of fuel gases with environmental requirements in mind.

The countercurrent principle of air and fuel can be utilised without specially adapting the structure. Seen from a thermodynamic point of view, this results in an optimum conversion and an efficient and cleaner process in which a smaller active surface is needed.

The maintenance of the fuel cell is extremely simple compared with monolithic/flat products. In the event of maintenance or a defect, it is sufficient to remove the pressure from the stack of elements and to remove the elements for examination or replacement.

The occurrence of leaks is more easily detected and the replacement of single elements is more advantageous than the replacement of the entire monolithic cell stack (and subsequent repair thereof).

Thin-layer techniques for flat surfaces can be used for the electrolyte and the interconnector as well as for the sealing-off if this is necessary. However, care does have to be taken that the walls of the electrodes remain gastight, with the result that use of thicker electrodes may be necessary under some circumstances. Overall, however, the compact nature of the flat plate-type product is not lost, with the result that a high power per volume/weight and energy per volume/weight is possible.

Figure 4:
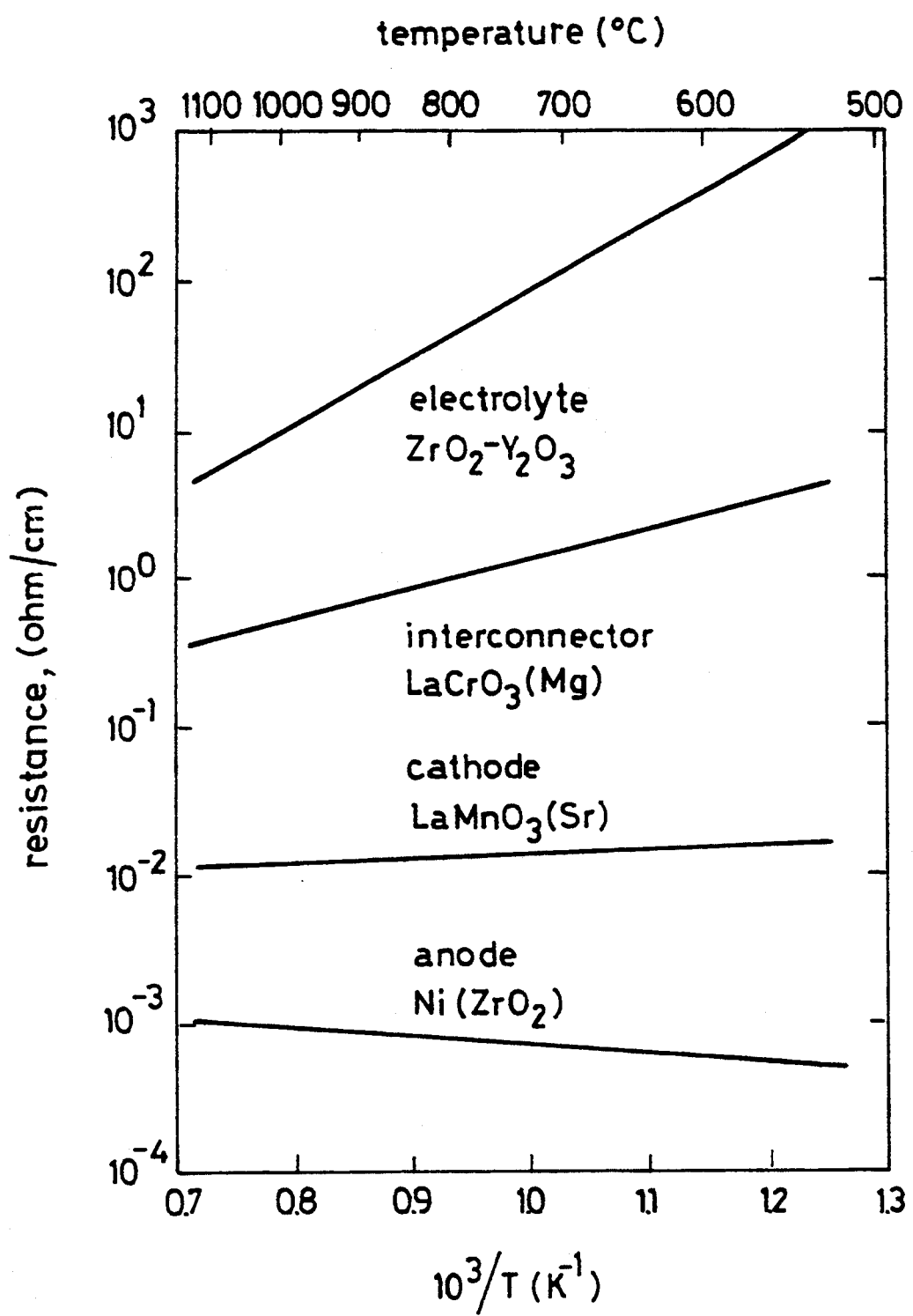
FIG. 4 is a graph of electrical resistance verses temperature.

In the product according to the invention, the gas-sealing action of the electrolyte layer is shifted to the electrode. As a result, it becomes possible to use an appreciably thinner electrolyte layer, which is important because the resistance of the electrolyte is an important component of the total electrical resistance in the conventional products (see FIG. 4). On the other hand, the required gastightness may cause the thickness of the electrodes to increase. This increase cannot increase too much because ionic conduction is, after all, a requirement imposed on the electrode. The conduction problem is therefore transferred from the electrolyte to the electrode. The availability of mixed-conduction materials having a sufficiently high oxygen-ion conductivity is therefore important.

Each element consists in principle of only one material, with the result that here again a considerably reduced risk of thermal stresses and better resistance to thermal cycles (thermal conductivity) are achieved. The production will be appreciably simpler and more economical because only one material is used.

Both air and the fuel gases are only in direct contact with the internal surface of the electrodes. In the case of internal reforming of the fuel, these reactions proceed completely separately from the rest of the fuel cell with the result that they are not contaminated or adversely affected as a result because only the (oxygen) ions will pass through the gastight walls.

Figure 5:
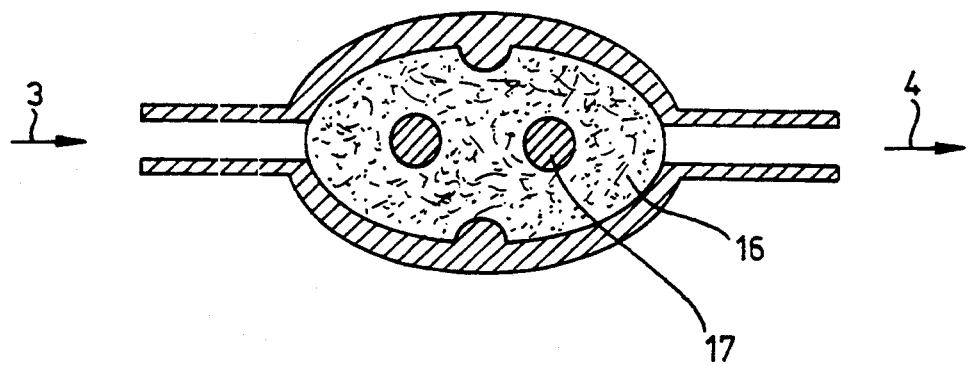
FIG. 5 is an illustration of a further embodiment of an electrode in accordance with the present invention.

The reliability in relation to leaks is increased, in particular in the event of the occurrence of thermal cycles. The construction of the elements may be such that the stack is able to withstand heavy mechanical loadings. Fine channels do not have to be used and the hollow electrode can be reinforced by using small supports which join the walls to one another. The outside wall can consist of the same, but now more compact material (see FIG. 5, in which 3 is a gas inlet and 4 a gas outlet, in which 16 is a porous internal structure and 17 is a reinforcement. 17 also serves as a gas distributor and as an additional current path).

If very thin electrolyte components are used, the high temperature which is required for adequate ionic conduction can be reduced, as a result of which higher theoretical efficiencies of the cell reaction can be achieved.

From the method according to the invention it is important that the hollow electrode has gastight outside walls and that an internal porous surface is made from a good mixed-conduction material. The making of such hollow electrodes is known. See D. F. Kroon and J. K. Dahms, "Fuel Cell Electrodes: part 1", Elsevier Sequoia Société Anonyme, Lausanne, Switzerland (1974), pages 40–46 and 51.

Figure 6:
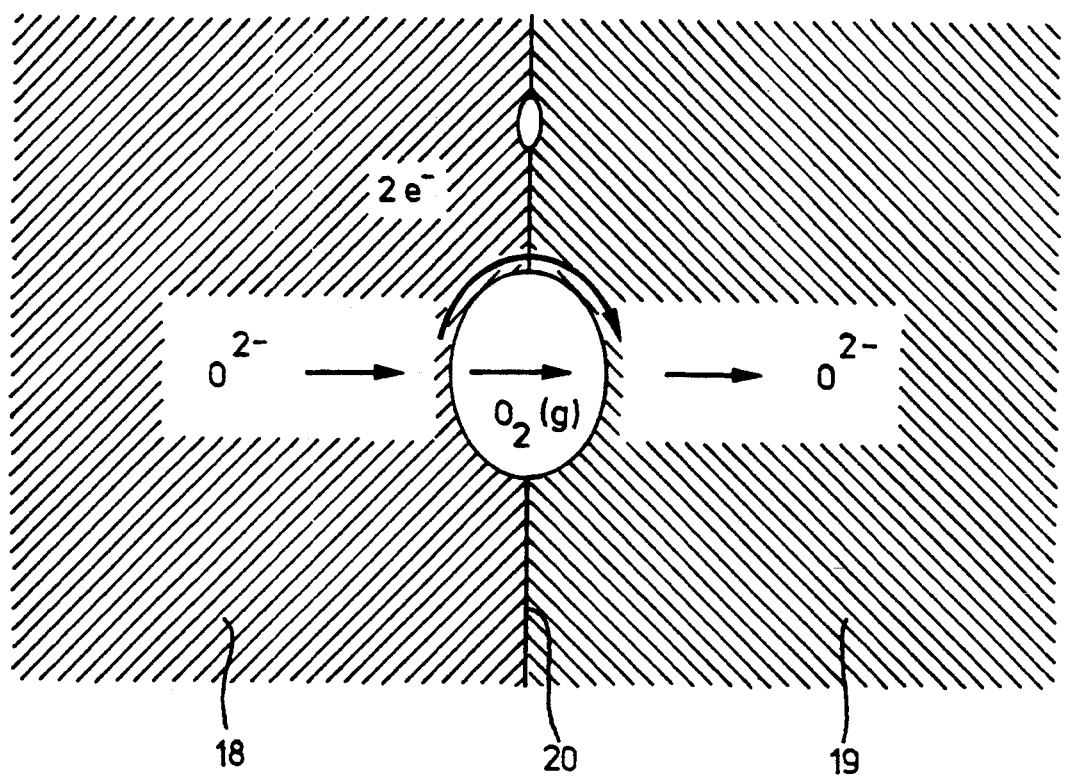
FIG. 6 is a further schematic illustration of a cell in accordance with the present invention.

The stacking of separate elements one on top of the other can result in a reduced electrical conduction. This is the result of the variations in the smoothness of the surfaces of the elements. This problem can be reduced by carefully polishing said surfaces. Finally, a fine conducting powder, for example the electrolyte material itself, can increase the effectiveness of the conducting surface. It is known (W. van Gool, Interphase Phenomena in Solid Electrochemical Cells, Fast Ionic Transport in Solids, Solid State Batteries and Devices, North Holland, Amsterdam (1973), page 477) that the maximum utilisation of the YSZ (yttrium-stabilised zirconia) electrolyte surfaces is obtained with a particle size of less than 4 micrometers. An additional advantage of using such a fine powder is that it exhibits a lubricating action between the moving elements during the thermal expansion. In the event of poor electrical contact, an oxygen transfer mechanism may also occur. The oxygen electrode reactions can take place in the reverse direction between an electrode and electrolyte surface. Now the forward electrode reaction can take place at the electrolyte surface or on the three interfaces. In this case, the electron current path will only be situated at the surfaces of electrolyte material or, if mixed-conduction powder is used, in the powder. In this way, it is possible to partially compensate for the loss of electrical contact. See FIG. 6, in which 18 is the electrode, 19 is the electrolyte and 20 is the contact surface. M. P. van Dijk, Ordering, Electrical Conductivity and Electrode Properties of Ceramics with Fluorite Related Structures, Ph.D. thesis, University of Technology, Twente, The Netherlands (1985).

Using gastight hollow electrodes makes it necessary for all the current to pass through the gastight walls of the electrodes in the form of an (oxygen-)ion current. In addition to good electronic conduction in the electrode material, good ionic conduction is necessary. Because of the low requirements imposed on the thermal coefficients of expansion, the number of possible choices is greater.

Since the gas-sealing function of the electrolyte is superfluous in the product according to the invention, only the requirement for ionic conduction is left. This has implications in relation to the choice of the solid electrolyte. Hitherto, owing to the stability of electrolytes made of stabilised zirconium oxide in both oxidising and reducing atmosphere and their properties in being easily rendered gas-sealing, little attention has been paid to other electrolytes. In the case of the invention, however, other solid electrolytes can also be used.

The interconnector materials must be pure electronic conductors. $CoCr_2O_4$ doped with 2 to 4 mol-% Mn, which is stable both in a reducing and in an oxidising atmosphere, appears to be particularly suitable. The conductivity of this material is, however, fairly low. Magnesium-doped $LaCrO_3$ appears to be an interconnector with good conduction, having a conductivity of approximately 2 S/cm at 1,000° C.

The making of hollow electrodes is known and in this connection reference can be made to D. F. Kroon and J. K. Dahms, Fuel Cell Electrodes: part 2, Elseviers Sequoia S. A., Lausanne, Switzerland (1974), pages 76–79. This discloses how to make electrodes having a varying degree of porosity through the electrode body (differential porosity). For the electrode according to the invention, reference is made to FIG. 3.

The electrolyte/interconnectors can be made by known methods. The conventional techniques for making flat plates of ceramic material can be used, for example calendering. Care should be taken that the plates are flat, are compact and exhibit no cracks. This is to prevent electrochemical short-circuiting.

In stacking the elements, it may be advantageous, as has already been stated earlier, to provide conducting powder between the elements. Furthermore, it may be advantageous to provide mechanical pressure to improve the electrical contact. The correct amount of pressure is applied if no further increase in the electrical voltage across the assembly of elements is achieved on increasing the pressure.

Because the elements at the bottom end are more heavily loaded mechanically as a consequence of the weight of the stack, it is desirable to carry out the stacking horizontally. In this case, care has to be taken that any loose powder between the elements remains present.

A force can best be provided by using a weight because this does not change as a result of thermal expansion. The vertical gravimetric force can more easily be converted into a horizontal force in a known way.

The interconnectors at the ends of the stacks are used as connector for the entire assembly. The connection to the conventional metal cables can take place inside the space in which the stack is accommodated. A thermal gradient in the metal cable cannot therefore be avoided. As a consequence of the good thermal conductivity, however, excessive thermal stresses are avoided.

In the choice of the temperature, factors play a part which will give grounds for choosing a high temperature and factors which would give grounds for choosing a low temperature. The following factors are reasons for a high temperature:
  a) decrease in electrical resistance,
  b) increase in the diffusion with a lower concentration polarisation as a consequence,
  c) increase in the reaction rate, including internal reforming, resulting in a lower activation polarisation,
  d) decreasing carbon deposition as a result of the Boudoir reaction,
  e) increased outlet temperature and, as a result, improved thermodynamic quality of the exhaust gases.

Factors which are reasons for lowering the temperature are:
  a) better thermodynamic efficiency of the electric current production,
  b) lower heat losses,
  c) less risk of increase in the electrical insulation as a result of interlayer forming between the elements.

The appropriate choice of conditions will always be made for every combination of materials. In this connection, attention should be paid to the fact that safety margins may be necessary for some critical effects (for example, the formation of interlayers).

We claim:

1. An electrochemical cell comprising a hollow electrode formed of a substantially gas impermeable inorganic material which exhibits both electronic and ionic conduction, said electrode having at least one gas inlet and at least one gas outlet.

2. An electrochemical cell according to claim 1 wherein the hollow electrode is of plate-type construction having top and bottom flat sections.

3. An electrochemical cell according to claim 1 wherein the hollow electrode defines an internal space having a porous internal structure which allows gas flow from the at least one gas inlet to the at least one gas outlet.

4. An electrochemical cell according to claim 1 wherein said hollow electrode is a cathode and said material is selected from the group consisting of $La_{1-x}Sr_xMnO_{3\pm y}$ and $La_{1-x}Sr_xCoO_{3\pm y}$ where $x \leq 1$ and $y \leq 3$.

5. An electrochemical cell according to claim 1 wherein said material is $(CeO_2)_{1-x}$—$(LaO_{1.5})_x$.

6. An electrochemical cell according to claim 1 wherein said material is $(CeO_2)_{1-x}$—$(YO_{1.5})_x$.

7. An electrochemical cell according to claim 1 comprising a plurality of alternating electrodes.

8. An electrochemical cell according to claim 7 wherein said alternating electrodes are alternating anodes and cathodes.

9. An electrochemical cell according to claim 8 wherein a conductive powder is provided between the electrodes.

10. An electrochemical cell according to claim 1 wherein said cell is a fuel cell.

* * * * *